Oct. 29, 1968   E. T. DOUGLASS, JR   3,407,943
APPARATUS FOR STORING AND FEEDING BULKY MATERIALS
Filed Oct. 18, 1966   2 Sheets-Sheet 1
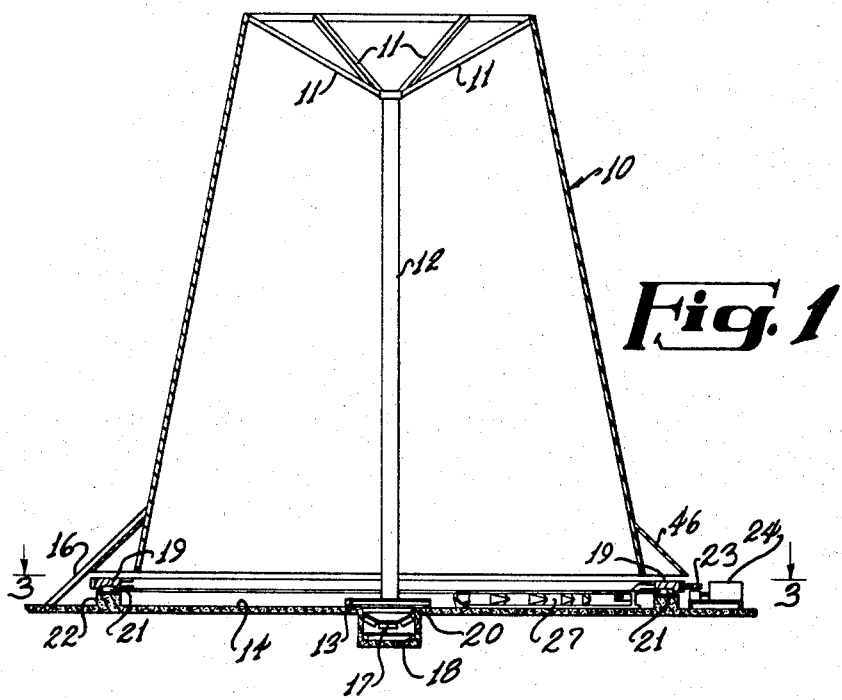
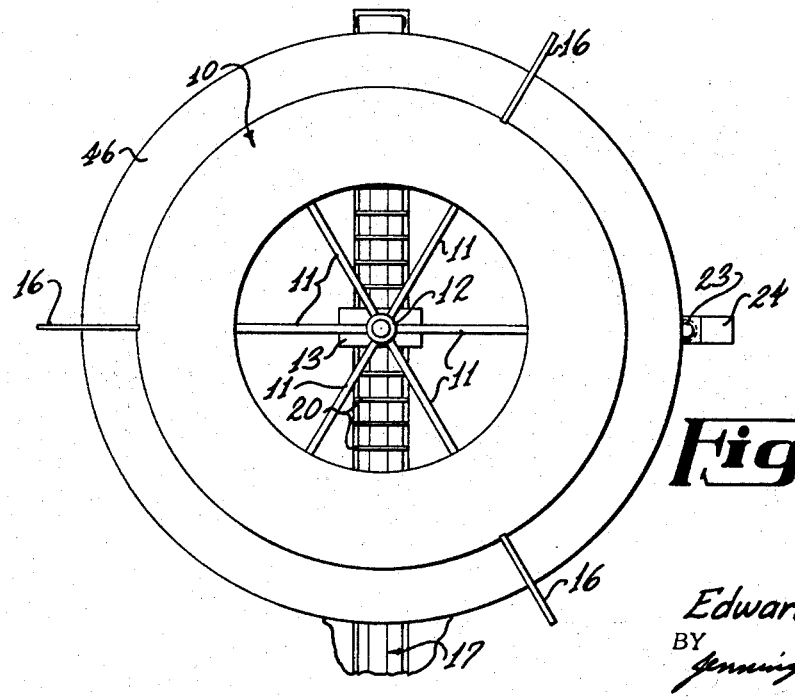
INVENTOR.
Edward T. Douglass, Jr.
BY
Attorneys Oct. 29, 1968  E. T. DOUGLASS, JR  3,407,943
APPARATUS FOR STORING AND FEEDING BULKY MATERIALS
Filed Oct. 18, 1966  2 Sheets-Sheet 2

INVENTOR.
Edward T. Douglass, Jr.
BY
Jennings, Carter + Thompson
Attorneys

United States Patent Office 3,407,943
Patented Oct. 29, 1968

3,407,943
APPARATUS FOR STORING AND FEEDING
BULKY MATERIALS
Edward T. Douglass, Jr., c/o Industrial Furnace Constructing Co., 2709 5th Ave., Birmingham, Ala. 35233
Filed Oct. 18, 1966, Ser. No. 587,442
10 Claims. (Cl. 214—17)

ABSTRACT OF THE DISCLOSURE

Apparatus for storing and feeding bulky materials having an open bottom storage bin with a conveyor extending therebeneath and spaced therefrom. A rotary unit rotates around the bin subjacent the periphery thereof and carries a substantially rigid arm which moves inwardly beneath the bin. At least one plow-like digging element is carried by the arm and is urged inwardly in position to dig into the materials.

---

This invention relates to apparatus for storing and feeding bulky materials such as wood bark, veneer scrap, sawdust, hogged wood scrap, peanut hulls and the like.

An object of my invention is to provide apparatus for storing and feeding bulky materials from a vertical column thereof in such a manner that the materials do not become packed, thus assuring even and controlled feed of the materials from the storage bin at all times.

Another object of my invention is to provide apparatus for storing and feeding bulky materials which shall include movable digging elements which are urged into engagement with the materials being handled subjacent the storage bin whereby the materials are loosened for easy removal.

A further object of my invention is to provide apparatus for storing and feeding bulky materials of the character designated which shall be simple of construction, economical of manufacture and one which is trouble free in operation and is relieved of the necessity of subjecting the feed system to the entire weight of the material stored and fed.

Heretofore, in the art to which my invention relates, difficulties have been encountered in discharging bulky materials, such as wood scrap, bark, peanut hulls and the like, from a storage bin due to the fact that the materials in the vertical column become packed whereby they do not fall onto a subjacent conveyor assembly. The difficult problem of handling such materials is further aggravated by the fact that the materials often swell whereby the volume of the materials is increased after being introduced into the storage bin.

To overcome the above difficulties and provide effective means for discharging the materials in an even manner, I provide an open bottom storage bin having downwardly flaring side walls. A conveyor unit is mounted beneath and in spaced relation to the lower end of the storage bin and a rotary unit is mounted for rotation in a horizontal plane intermediate the storage bin and the conveyor. A plurality of digging elements are mounted for horizontal pivotal movement on the rotary unit in position to move inwardly and outwardly beneath the storage bin whereby the bulky material is loosened while the digging elements are moved inwardly beneath the storage bin. Means is provided to urge the digging elements inwardly beneath the storage bin at a predetermined pressure, thus preventing excessive pressures from being applied to the digging elements.

Apparatus embodying features of my invention is illustrated in the accompanying drawings, forming a part of this application, in which:

FIG. 1 is a vertical sectional view through the storage bin and feed mechanism;

FIG. 2 is a top plan view of the apparatus shown in FIG. 1;

Figure 3:
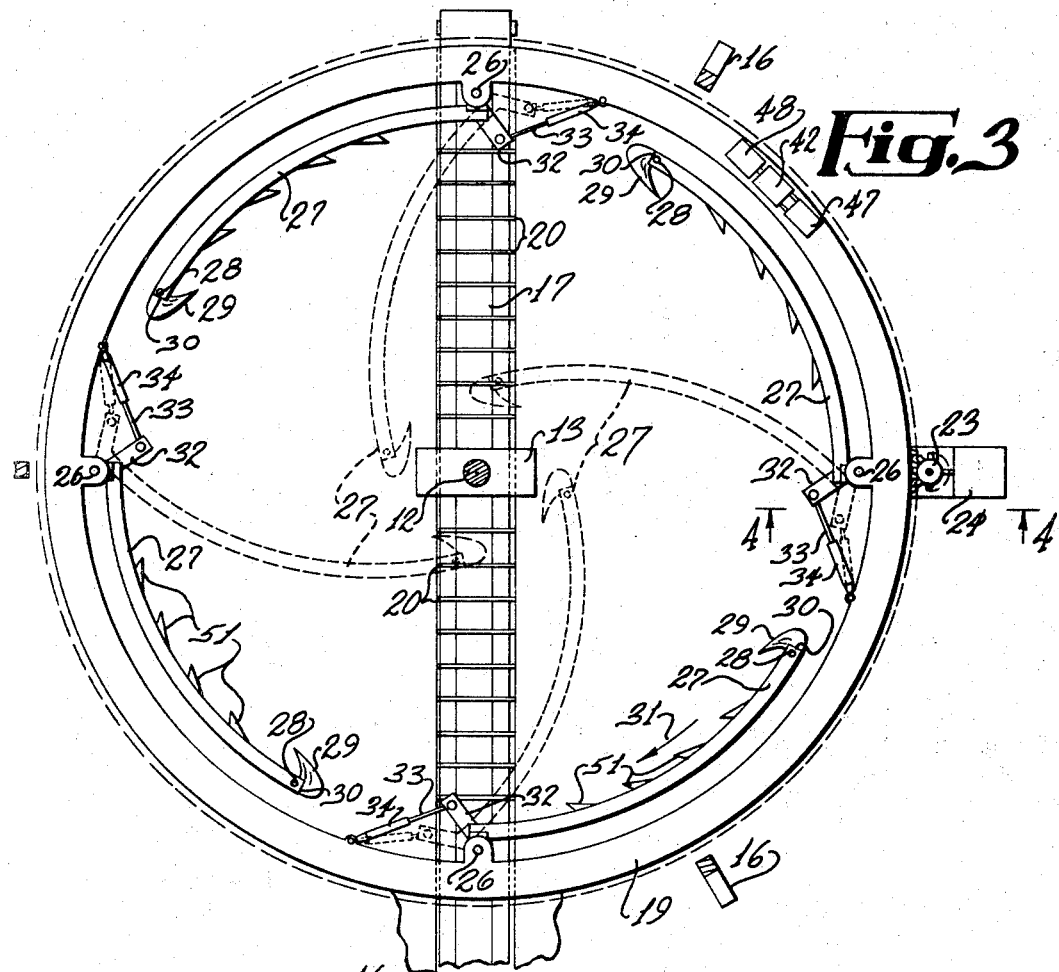
FIG. 3 is an enlarged sectional view taken generally along the line 3—3 of FIG. 1.

Referring now to the drawings for a better understanding of my invention, I show an open bottom storage bin 10 having downwardly flaring side walls which prevent packing of the materials due to swelling and weight. The upper end of the storage bin 10 is secured to downwardly and inwardly extending support members 11 which are connected at their inner ends to the upper end of a vertical support column 12. The lower end of the support column 12 is secured to a transverse support member 13 which in turn is supported by a horizontal supporting surface 14, as shown in FIG. 1. Suitable diagonal braces 16 are mounted at the lower sides of the storage bin 10, as shown in FIGS. 1 and 2 to retain the storage bin in a vertical position at all times.

Extending transversely of the storage bin 10 and beneath the transverse support member 13 is an endless conveyor unit 17 for removing materials handled by my apparatus, such as bark, wood scrap, peanut hulls and the like. As shown in FIG. 1, a transverse recess or trench 18 is provided in the supporting surface 14 for receiving the conveyor unit 17.

Figure 4:
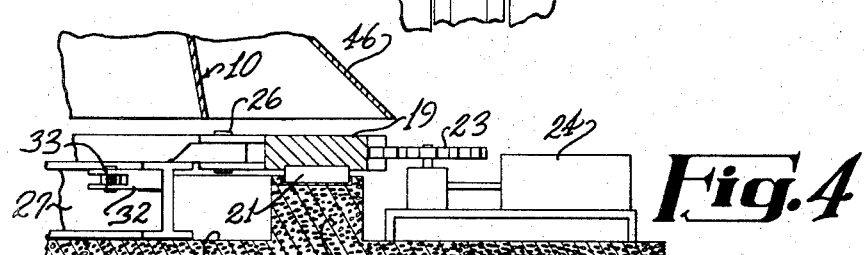
FIG. 4 is an enlarged, fragmental view taken generally along the line 4—4 of FIG. 3.

Mounted for rotation in a generally horizontal plane beneath the lower end of the storage bin 10, as shown in FIGS. 1, 3 and 4, is an annular member, such as a ring gear 19. As shown in FIGS. 1 and 4, the ring gear 19 is supported by suitable rollers 21 which are interposed between the ring gear 19 and an annular support member 22. Suitable recesses are provided in the under surface of the ring gear 19 and in the upper surface of the annular member 22 for receiving the rollers 21, as shown in FIG. 4. The ring gear 19 is driven by a pinion 23 which in turn is operatively connected to a power unit, such as a motor 24.

Pivotally connected to the annular rotary unit 19 by suitable pivot pins 26 are angularly spaced arms 27. That is, one end of each arm 27 is pivotally connected by the pivot pin 26 to the annular member 19 while the other end of each arm is adapted to move from the solid line position shown in FIG. 3 to the dotted line position. Pivotally connected to the end of each arm 27 opposite the pivot pin 26 by means of a pivot pin 28 is a plow-like digging element 29. A stop member 30 limits pivotal movement of each digging element 29 relative to its arm 27. Each digging element 29 is provided with a curved surface which causes the materials to be directed outwardly in a generally horizontal direction as the arms 27 move in the direction of the arrow 31. Inwardly projecting digging elements 51 are also provided along the inner surface of arms 27. As shown in FIG. 4, each arm 27 is in the form of a curved I beam whereby a substantially rigid, sturdy and relatively wide, vertically extending contact surface is provided for each arm 27. A plurality of spaced apart cross bars 20 extend across the top of the recess 18 to facilitate movement of the arms 27 across the recess. The cross bars 20 are flush with the supporting surfaces 14, as shown.

Formed integrally with or rigidly connected to the end of each arm 27 adjacent the pivot pin 26 is an outwardly projecting bracket 32. Pivotally connected to the outer end of the bracket 32 is one end of a piston rod 33 of a fluid pressure operated cylinder 34, which may be actuated hydraulically or pneumatically. Each cylinder 34 is a double acting whereby upon introducing fluid at opposite ends of the cylinder 34, the piston rods 33 are moved in opposite directions to urge the arms 27 toward the dotted line positions and solid line positions, respectively.

Figure 5:
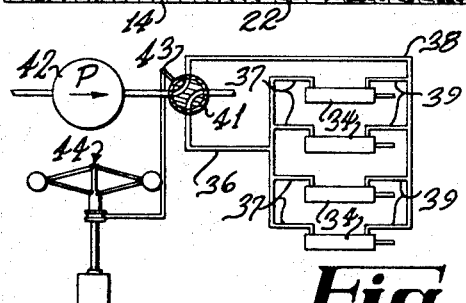
FIG. 5 is a diagrammatic view showing means for actuating the double action, fluid pressure operated cylinders.

Fluid under pressure is introduced to one end of each of the fluid pressure operated cylinders 34 by a conduit 36 having suitable branch conduits 37. Fluid is introduced into the opposite end of the cylinder 34 by a supply conduit 38 having suitable branch conduits 39. The conduits 36 and 38 communicate with a control valve 41 which communicates with a pump or compressor 42, as shown in FIG. 5. The valve 41 is actuated to introduce fluids under pressure selectively at opposite ends of the cylinder 34 by a control linkage indicated generally at 43 which is operatively connected to a centrifugally actuated control unit 44. The control unit 44 is so constructed that so long as the annular member 19 is in motion, fluid under pressure is introduced into the end of each cylinder 34 to urge the arms 27 inwardly toward the dotted line position shown in FIG. 3. On the other hand, upon stopping rotation of the annular member 19, the centrifugally actuated control member 44 moves the control linkage 43 in a direction to actuate valve 41 and thus introduce fluid under pressure into the opposite end of each cylinder 34 whereupon the arms 27 are all moved to the outer or solid line position shown in FIG. 3. It will thus be seen that each time the apparatus is stopped, the arms 27 move to the outermost position whereby a minimum load is placed upon the arms 27 during initial rotation of the annular member 19. That is, in the event the annular member 19 should stop rotating with the digging arms 27 in the dotted line position shown in FIG. 3, they would be covered by the downwardly moving material whereby a great strain would be placed on the arms during initial rotation of the annular member 19. Where the compressor 42 is driven electrically a suitable electrical relay and electrically actuated solenoids would be employed in a manner well understood in the art to reverse the direction of flow through valve 41.

To prevent spillage of the materials being handled outwardly of the storage bin 10, I provide a downwardly flaring umbrella-like member 46 which surrounds the lower portion of the storage bin 10, as shown in FIGS. 1 and 4.

Fluid under pressure is supplied to the pump or compressor 42 by a reservoir 47. The pump or compressor 42 is driven by a suitable power unit 48, such as an internal combustion engine or an electric motor. As shown in FIG. 3, the power unit 48, compressor 42 and reservoir 47 are all carried by the ring gear 19, thus eliminating the necessity of providing fluid seals.

From the foregoing description, the operation of my improved apparatus will be readily understood. The material to be handled is introduced into the top of the storage bin 10 by conventional means, such as a conveyor, blower system or the like. The downwardly flaring shape of the storage bin 10 prevent packing of the material due to swelling and weight whereby the material will fall onto the supporting surface 14 where the plow-like digging elements 29 dig into the outer surface of the material and direct the same outwardly. As the material is thus dug and moved outwardly by the plow-like elements 29, the rotating arms 27 drag the material into the conveyor unit 17 whereby the materials are removed. Since the arms 27 are relatively wide, they extend a substantial distance in a vertical plane to thus drag the materials into the conveyor 17. The inwardly projecting digging elements 51 aid further in loosening the materials whereby they fall onto the supporting surface 14.

The pressure exerted by the hydraulic cylinders 34 is controlled to regulate the rate of feed of materials. Also, the rate of feed can be controlled by varying the operating speed of the drive motor 24. Preferably, the ring gear 19 is driven at a relatively slow speed and the rate of feed is controlled by varying the pressure exerted by the hydraulic cylinders 34 against the arms 27. In the event excessive pressure is applied to the arms 27 by the material within the bin 10, the arms are moved outwardly toward the solid line position, thus relieving the load on the drive assembly 24. Accordingly, the apparatus is automatic in adjusting itself to such excess pressures, thus preventing damage to the apparatus and the drive means therefor.

While I have shown the means for urging the arms 27 inwardly beneath the storage bin 10 as being fluid pressure operated cylinders, other suitable means may be employed such as springs.

By regulating the rate of rotation of the annular ring 19 or by regulating the pressure exerted on the pressure cylinders 34, the rate of feed from storage bin 10 can be controlled to a degree uncommon in the operation of conventional type storage bins of large storage capacity. My apparatus is particularly adapted for use with chemical apparatus such as a continuous carbonizer used in the manufacture of charcoal, wherein the rate of feed could be controlled automatically by the temperature at any stage of the carbonizing process, by the percentage of certain gases such as carbon dioxide or carbon monoxide which would be indicative of the efficiency of the operation, or any other indicator which would indicate optimum operating conditions of the system.

From the foregoing, it will be seen that I have devised an improved apparatus for storing and feeding bulky materials, such as wood scrap, peanut hulls and the like. By providing means for continuously digging into the lower periphery of the mass of materials subjacent the storage bin, together with means for dragging the materials on a subjacent supporting surface, the materials are delivered to the conveyor in an even manner. Also, by providing means for varying the pressure exerted by the digging elements, together with means for releasing the digging elements when the apparatus is stopped, a predetermined force is applied to the materials by the plow-like elements and at the same time the digging elements are not subjected to excessive forces.

While I have shown my invention in but one form, it will be obvious to those skilled in the art that it is not so limited, but is susceptible of various other changes and modifications without departing from the spirit thereof, and I desire, therefore, that only such limitations shall be placed thereupon as are specifically set forth in the appended claims.

I claim:

1. In apparatus for storing and feeding bulky materials:
    (a) an open bottom storage bin,
    (b) a conveyor extending beneath said storage bin in position to remove materials discharged at the bottom of said storage bin,
    (c) means supporting said storage bin above and in spaced relation to said conveyor,
    (d) a rotary unit mounted for rotation around the storage bin subjacent the periphery thereof in a generally horizontal plane intermediate said storage bin and said conveyor,
    (e) at least one substantially rigid arm mounted adjacent one end thereof for horizontal pivotal movement on said rotary unit with the other end of said arm being adapted to move inwardly and outwardly beneath said storage bin with an intermediate portion of said arm in position to drag said materials into the conveyor,
    (f) a plow-like digging element carried by said other end of said arm in position to dig into the said materials subjacent the lower end of said storage bin, and
    (g) means urging said other end of said arm horizonally inward beneath said storage bin.

2. In apparatus for storing and feeding bulky materials as defined in claim 1 in which the means supporting said storage bin comprises:
  (a) a horizontal supporting surface beneath and in spaced relation to said storage bin,
  (b) an upstanding vertical support mounted on said supporting surface adjacent the center of said storage bin, and
  (c) means securing the upper end of said vertical support to upper portions of said storage bin whereby said storage bin is supported by said vertical support.

3. In apparatus for storing and feeding bulky materials as defined in claim 2 in which the plow-like digging element is mounted in position to move adjacent said support surface as it engages the bulky materials.

4. In apparatus for storing and feeding bulky materials as defined in claim 1 in which said rotary unit comprises:
  (a) an annular member supported by rollers for rotation in a generally horizontal plane subjacent said storage bin, and
  (b) a power unit operatively connected to said annular member for rotating said annular member.

5. In apparatus for storing and feeding bulky materials as defined in claim 1 in which a plurality of arms are mounted for horizontal pivotal movement on the rotary unit at angularly spaced locations.

6. In apparatus for storing and feeding bulky materials as defined in claim 1 in which the plow-like digging element is of a shape and size to dig into the materials upon rotation of said rotary unit and move said materials outwardly in a generally horizontal plane.

7. In apparatus for storing and feeding bulky materials as defined in claim 1 in which the means urging said other end of said arm horizontally inward beneath the storage bin comprises a fluid pressure operated cylinder interposed between said rotary unit and said arm.

8. In apparatus for storing and feeding bulky materials as defined in claim 7 in which the fluid pressure operated cylinder is a double acting cylinder having means for introducing fluid into opposite ends thereof whereby said cylinder urges said arm selectively toward inward and outward positions beneath said storage bin.

9. In apparatus for storing and feeding bulky materials as defined in claim 8 in which means is provided to introduce fluid under pressure into the end of said double acting cylinder to urge said arm outwardly in response to stopping rotation of said rotary unit.

10. In apparatus for storing and feeding bulky materials as defined in claim 1 in which inwardly projecting digging elements are provided along the inner surface of said arm.

References Cited

UNITED STATES PATENTS 3,011,658  12/1961  Peterson _____ 214—17 XR

FOREIGN PATENTS 209,784  6/1960  Austria.
101,986  6/1963  Norway.

ROBERT G. SHERIDAN, *Primary Examiner.*